Dec. 19, 1933.  J. B. SPOWART  1,939,796
DUCT RODDING APPARATUS
Filed Sept. 13, 1932    5 Sheets-Sheet 1
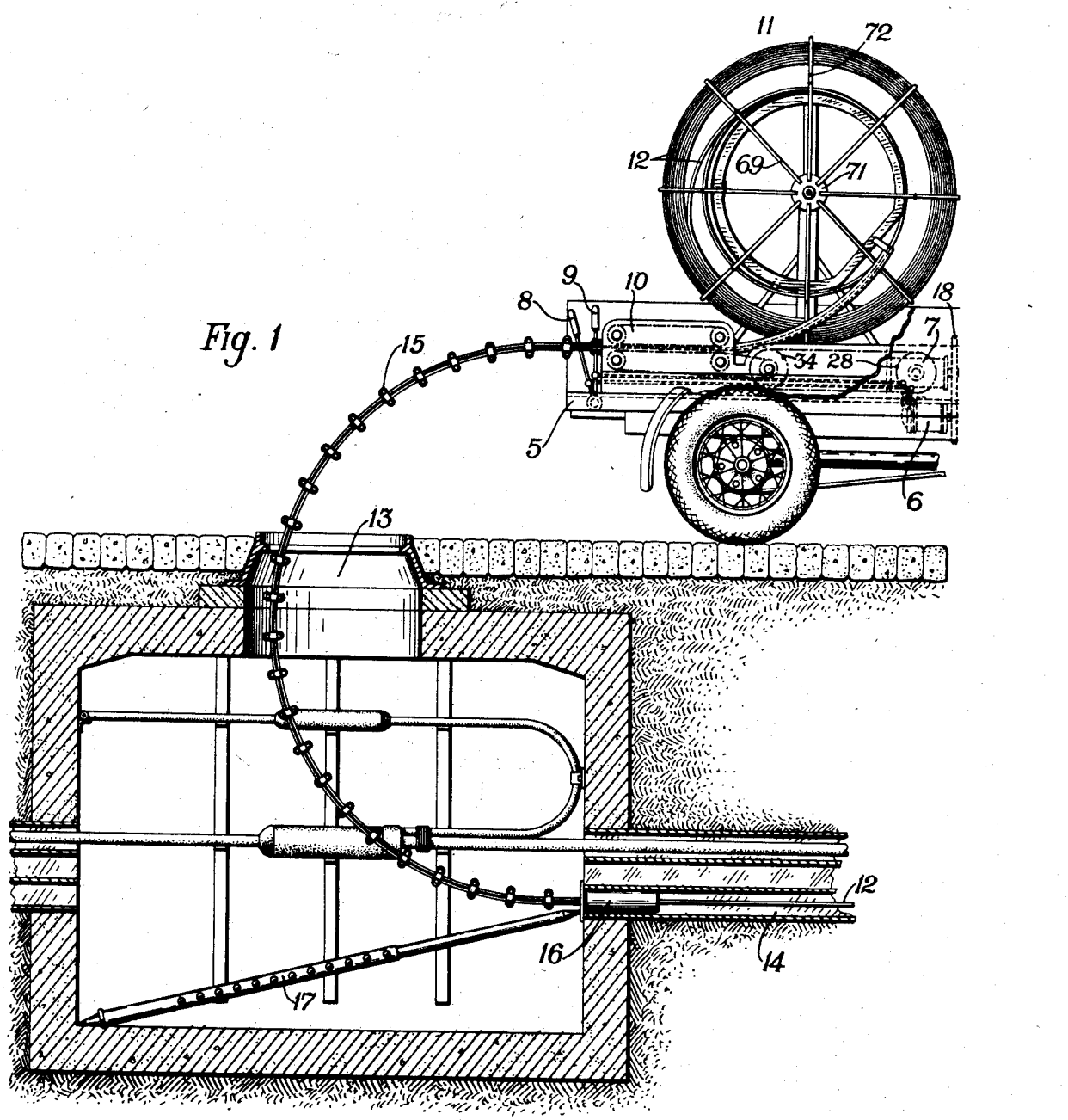
INVENTOR
J. B. Spowart
BY James E. Lynch
ATTORNEY

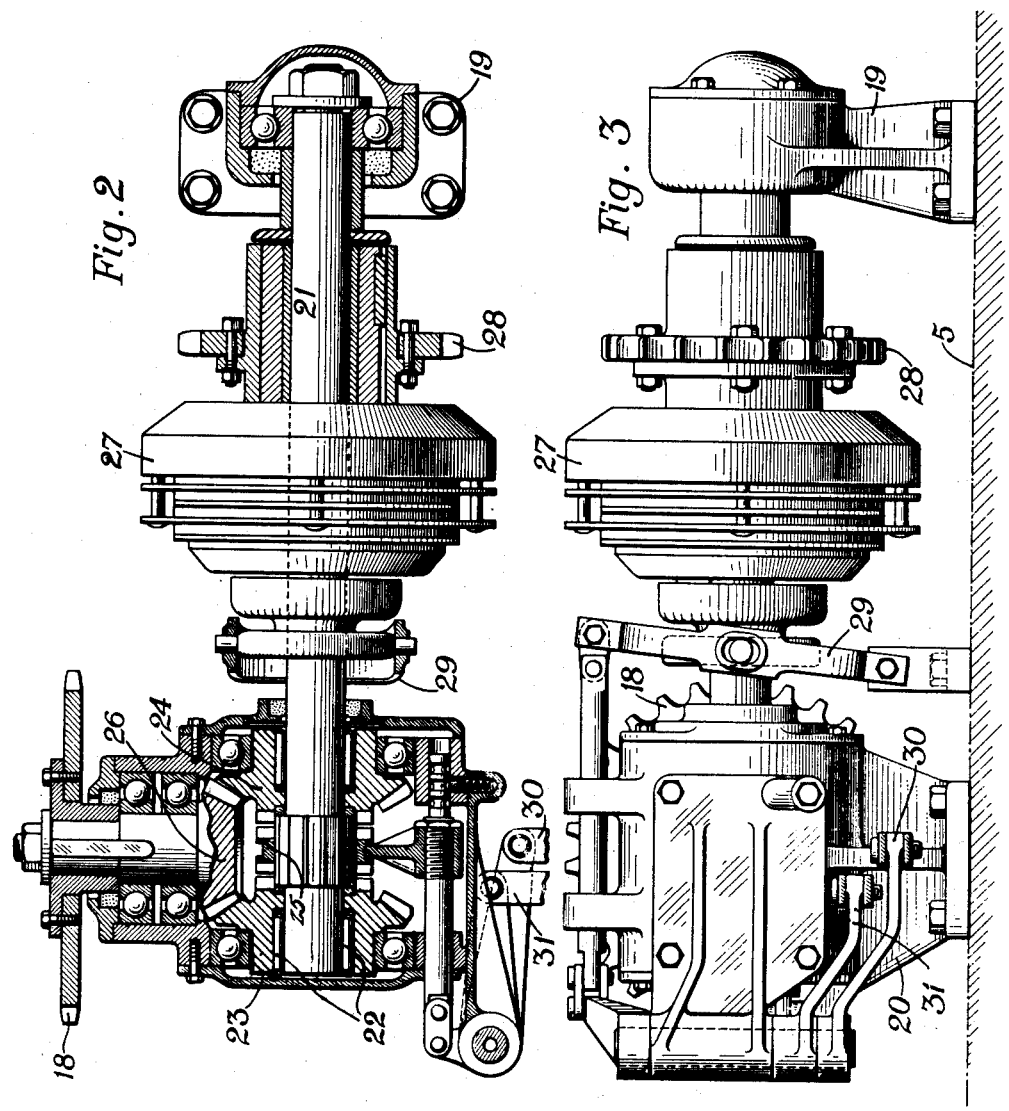

Dec. 19, 1933.    J. B. SPOWART    1,939,796
DUCT RODDING APPARATUS
Filed Sept. 13, 1932    5 Sheets-Sheet 3

INVENTOR
J. B. Spowart
BY James E. Lynch
ATTORNEY

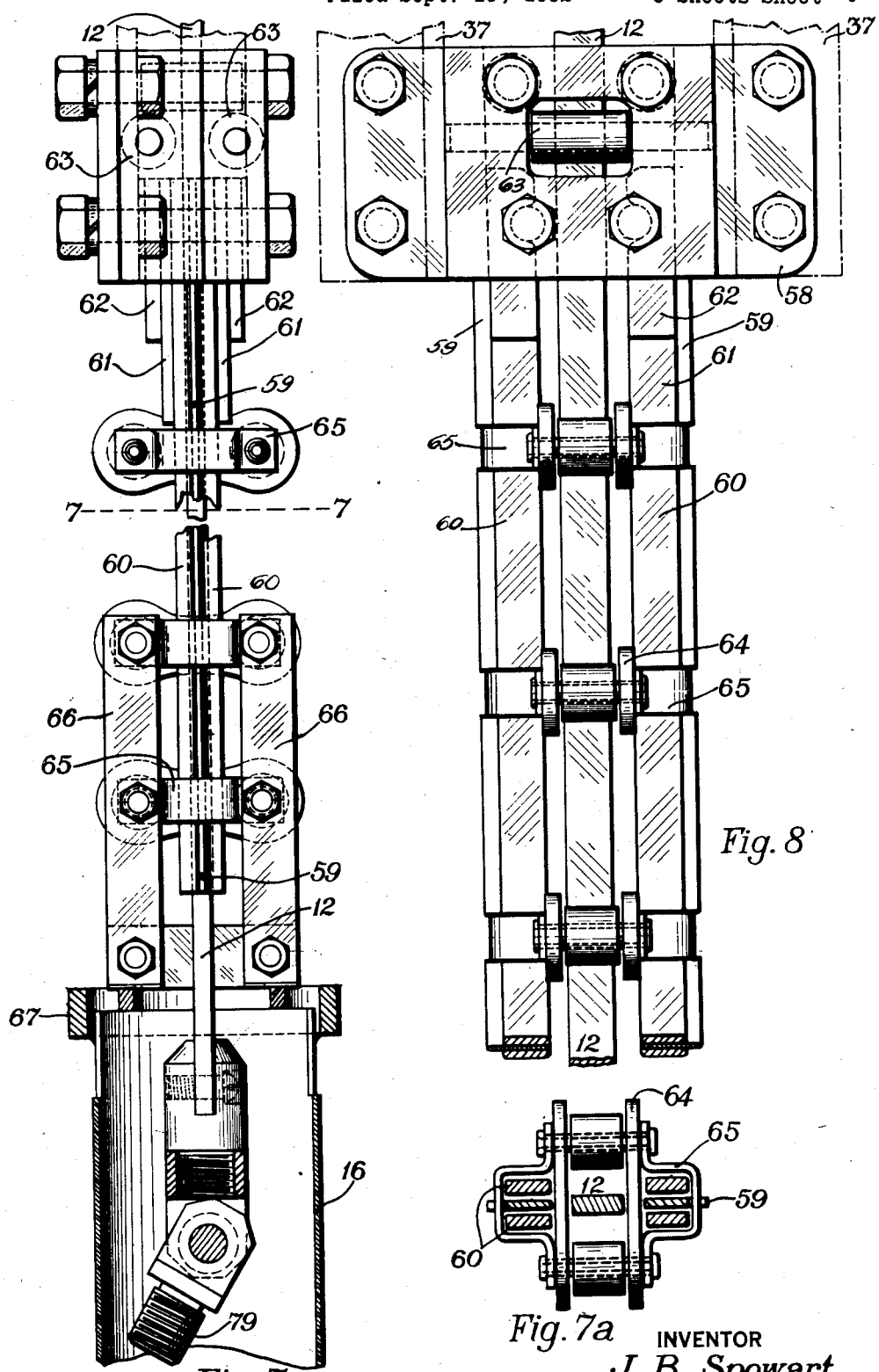

Dec. 19, 1933.  J. B. SPOWART  1,939,796
DUCT RODDING APPARATUS
Filed Sept. 13, 1932    5 Sheets—Sheet 5

INVENTOR
J. B. Spowart
BY James E. Lynch
ATTORNEY

Patented Dec. 19, 1933

1,939,796

UNITED STATES PATENT OFFICE 1,939,796

DUCT RODDING APPARATUS

John B. Spowart, Newark, N. J., assignor to American Telephone and Telegraph Company, a corporation of New York Application September 13, 1932
Serial No. 633,014

1 Claim. (Cl. 175—376)

This invention relates to rodding apparatus, and has for its object the provision of apparatus of this character which is adapted for use in conduit ducts to introduce wires into the ducts to subsequently pull cables therethrough.

In accordance with one feature of the invention the duct rodding apparatus is mounted on a motor truck or the like from which power may be derived to mechanically propel a metal rod or tape in a conduit duct from one manhole to the next, where a wire may be attached to the end of said rod or tape which is then mechanically withdrawn with the attached wire back to the first manhole, and the wire may be left in the duct to subsequently pull cables therethrough.

Another feature of the invention consists in the provision of clutch and reverse mechanism for connecting and disconnecting power for operating the apparatus.

A further feature consists in the provision of improved reel mechanism for winding and unwinding the metal rod or tape.

These and other features will be apparent from the following description, when considered in connection with the accompanying drawings in which one modification of the invention is illustrated.

Referring to the drawings, Figure 1 is a sectional view of a manhole showing lead-in apparatus extending from a reel mounted on a motor truck into a manhole and conduit duct.

Fig. 2 is a plan view partly in section showing the clutch and power reversing mechanism for operating tractor mechanism by which the metal rod or tape is introduced and withdrawn from the conduit duct.

Fig. 3 is an elevation of the apparatus shown in Fig. 2 as viewed from the rear end of the truck.

Fig. 7 is a side elevation partly in section, of the apparatus for leading the rod or tape into and from the duct.

Fig. 7a is a section taken on the line 7—7 of Fig. 7.

Fig. 8 is a partial plan view of Fig. 7.

Figure 4:
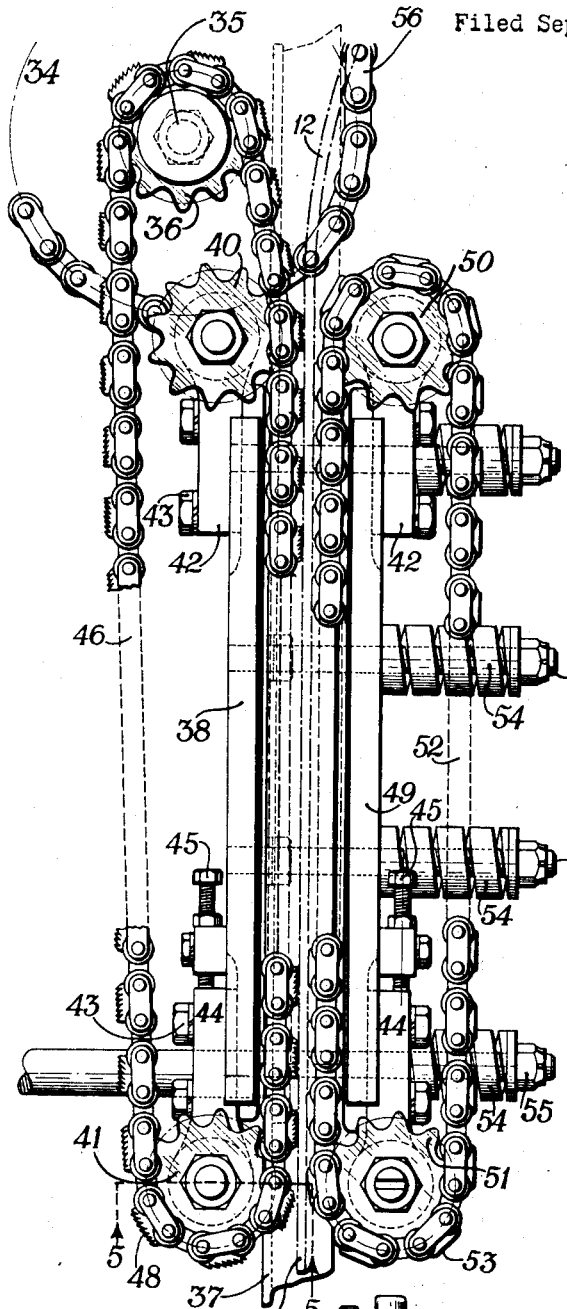
Fig. 4 is a side elevation of the tractor mechanism as seen from the left side of the motor truck as viewed from the front.
Figure 5:
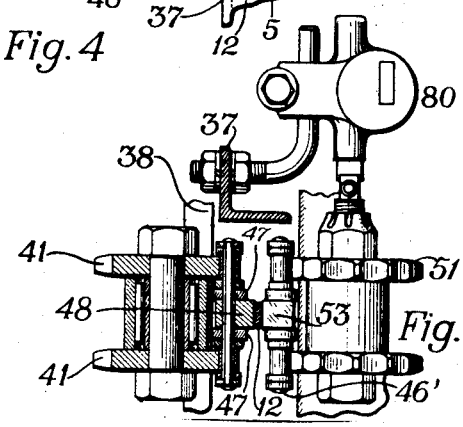
Fig. 5 is an end elevation, partly in section, of Fig. 4.
Figure 6:
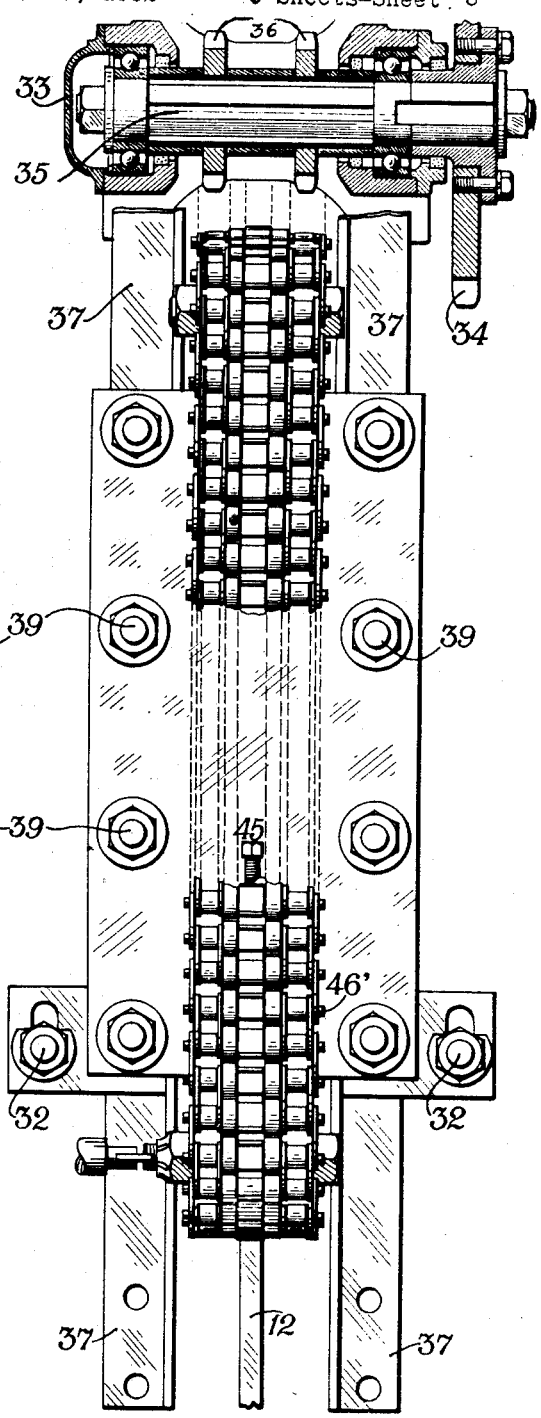
Fig. 6 is a plan view, partly in section, of Fig. 4.

In the drawings wherein the improved apparatus is illustrated, the character 5 in Fig. 1 indicates a frame of a motor truck on which the apparatus may be mounted. Power for operating the apparatus may be derived from a power take-off 6 which may be coupled with the engine of truck in a manner well understood. Clutch and reversing mechanism 7, which will be presently described, is connected to the power take-off. Control levers 8 and 9 are mounted on the rear of the truck and are connected by suitable linkage to the clutch and reversing mechanism 7. Tractor mechanism 10, as more clearly shown in Figs. 4, 5 and 6, is mounted on the frame which is fastened to the truck and is positioned at the rear of a reel 11, which is also mounted on the frame. Metal rod or tape 12 is wound and unwound from this reel by the tractor mechanism 10 which propels and withdraws the rod or tape into and from the manhole 13 and conduit duct 14 through the flexible lead-in apparatus 15. It will be understood that while the member 12 is shown as being in the form of suitable resilient tape, resilient material having other forms, such as a rod, may be used. The lead-in apparatus terminates in a sleeve 16 which is positioned in the duct and maintained there by means of a telescoping or collapsing thrust-brace 17. This brace takes the back thrust of the tape caused by the friction set up by the movement of the tape in the duct. The steel tape when propelled from one manhole to the next manhole is there fastened to a wire, and the tape and attached wire are then withdrawn to the first manhole and the wire is left in the duct for subsequently pulling a cable therethrough.

Power is transmitted from the power take-off 6, Fig. 1, through suitable means such as a chain to the sprocket 18 of the reversing and clutch mechanism 7, as shown in Figs. 2 and 3. The mechanism 7 is mounted on the assembly frame 5 by means of suitable supports 19, 20 and a drive shaft 21 having anti-friction bearings 22 is also carried by these supports. Bevel gears 23 and 24 are carried on the shaft 21 and are journaled in support 20. These gears are provided with clutch jaws which engage with jaw clutch 25 and rotate shaft 21 in accordance with the direction desired. The gears 23 and 24 derive their power from pinion 26, on which sprocket 18 is mounted. A friction clutch 27 is mounted on the shaft 21 and a sleeve mounted on the shaft and extending from the clutch carries a sprocket 28. When clutch yoke 29 is thrown to compress the discs of the clutch 27, power is transmitted to rotate sprocket 28. The operation of jaw clutch 25 is accomplished by suitable linkage from a clevis 30 to the control lever 8, and the clutch is controlled by suitable linkage from the clevis 31 to the control lever 9. These levers 8 and 9 are shown in Fig. 1.

The tractor mechanism 10, as shown in Figs. 4, 5 and 6 which propels and withdraws the tape, is mounted on the assembly frame 5 by means of bolts 32 and similar bolts (not shown) secure housing 33 to said frame. Sprocket 34, which is mounted on a shaft 35, and this shaft is journaled in the housing 33 and carries multiple sprockets 36. A pair of parallel angle-iron brackets 37, which extend longitudinally of the truck are mounted at one end in the housing 33 and on the other end to the frame 5 by means of bolts 32. A lower stationary plate 38 of rectangular formation is secured to the angle irons 37 by means of a plurality of bolts 39 arranged in parallel pairs. Double idler sprockets 40 and 41 are fastened to the respective ends of the plate 38 by means of extension support 42 and bolts 43 at one end, and by adjustable extension support 44 and bolts 43 at the other end, Fig. 4. A screw 45 adjusts the tension of a multiple roller chain 46, which is constructed from a plurality of links. The chains are interconnected by means of link pins, 46' and each pin carries two rollers 47 between each of which a puller block 48 having an outer toothed gripping surface is positioned. The multiple chain 46 travels over sprockets 36, 40 and 41, and the rollers 47 of the puller blocks 48 of this chain travel on the upper surface of plate 38. An upper plate 49 of rectangular formation lies parallel to the plate 38 and is slidably mounted and adapted to move vertically on the bolts 39. This plate is provided at one end with an extension support 42, on which multiple sprocket 50 is mounted. At the other end, the plate 49 is provided with extension support 44 which provides a mounting for multiple sprocket 51. A chain 52 interconnects the sprockets 50 and 51 and is adjusted by means of a screw 45 which is similar to the screw 43 described in connection with the adjustment of the lower chain 46. This chain travels along the bottom of plate 52 adjacent to chain 46. The chain 52 is constructed similarly to chain 46, except that the outer or engaging surfaces of the puller blocks 53 are smooth. The bolts 39 are positioned on either side of the multiple chains 46 and 52 and are provided with compression springs 54, which springs are adjusted by means of nuts 55, Fig. 4. A chain 56, connects the sprocket 28 of the reversing and clutch mechanism shown in Figs. 2 and 3 with the sprocket 34 of the tractor mechanism shown in Figs. 4 and 6. The rod or tape 12 extends between the puller blocks 53 of chain 52 and the puller blocks 48 of chain 46 and this tape or rod is drawn from reel mechanism, to be presently described, and propelled into or withdrawn from a conduit duct 14 by means of these puller blocks. Pressure is exerted by the compression spring 54 to the vertically movable plate 49, and this plate transmits this pressure through the puller blocks 53 of chain 52 to the rod or tape 12. This pressure is conveyed to the puller blocks 48 which are caused to grip the rod or tape and through the movement of the chain 46 draw said rod or tape from the reel, to be presently described, and push it into the duct. The movement of the chain 46 in direction, causes the withdrawal of the rod or tape from the duct back into wound position on the reel.

The lead-in apparatus 15 by which the rod or tape 12 is introduced into the duct, is shown in Figs. 7, 7a and 8. This lead-in apparatus is of flexible character and extends from the tractor mechanism 10 and terminates in sleeve 16, which is positioned in the duct 14, as disclosed in Fig. 1. The lead-in apparatus 15 includes a terminating clamp 58 of rectangular formation, which is attached by means of bolts to the angle irons 37 of the tractor drive mechanism 10 illustrated in Figs. 4, 5 and 6. The clamp 58 includes two plates which are so shaped that they may receive and retain the ends of spacing bands 59, the ends of flexible tapes 60 and feathering tapes 61 and 62. The ends of the spacing bands 59, flexible tapes 60 and feathering tapes 61 and 62 are each provided with a semi-circular cut-away portion. Bolts passing through the plates of the clamp 58 register in the cut-away portions of the elements enumerated and provide secure anchorage for one end of the lead-in apparatus. The feathering strips are arranged in pairs each pair comprising a long strip 61 and a short strip 62. The strip 61 of each pair lies flatly upon flexible tape 60 and the strip 62 of each pair lies flatly upon its companion strip 61. Each of these pairs of strips 61 and 62 is held by clamp 58. Each pair of strips 61 and 62 exerts such action upon the spacing bands 59 and flexible tapes 60 as to constrict too abrupt bending of the rod or tape 12 and the tapes 60 as they leave clamp 58. Two pairs of guide rollers 63, one pair lying in a horizontal position and the other pair in a vertical position, are journaled in the clamp 58 and the rod or tape 12 passes between these rollers, and through roller units to be presently described.

The lead-in apparatus 15 has a plurality of uniformly spaced roller units arranged in pairs which extend from the clamp 58 to a terminating sleeve 67. These roller units consist of two parallel rollers positioned between side links 64 on the spacing band 59 and a bracket 65 is mounted on each side link. These brackets are of substantially U-formation, and have outwardly extending lugs provided with openings which register with openings in the links. The spacing band 59 extends through each of the U-shaped brackets, and corresponding notches in these bands form a retainer for the brackets. Bolts pass through the openings in the oppositely positioned lugs of the brackets and form a journal for the rollers. The length of flexible tape 60 is positioned within the brackets in the spaces on each side of the flat surfaces of the spacing bands 59. The other extremity of the lead-in apparatus 15 is supported on two pairs of oppositely positioned mounting bands 66. These bands in the present instance, as more clearly shown in Fig. 7, are attached by bolts at one end to the terminating roller units of the lead-in apparatus 15. The other or outer ends of the bands are attached by bolts to lugs provided on the sleeve end 67. The bands thus provide an anchor for the other or duct-entering end of the lead-in apparatus 15. The mounting bands 66 thus terminate in such manner as to leave the ends of spacer band 59 and flexible tapes 60 free to assume any position which may be required in the movement of rod or tape 12. When the lead-in apparatus is in position, the rod or tape 12 is propelled and withdrawn into and from the duct by the tractor mechanism previously described.

Figure 11:
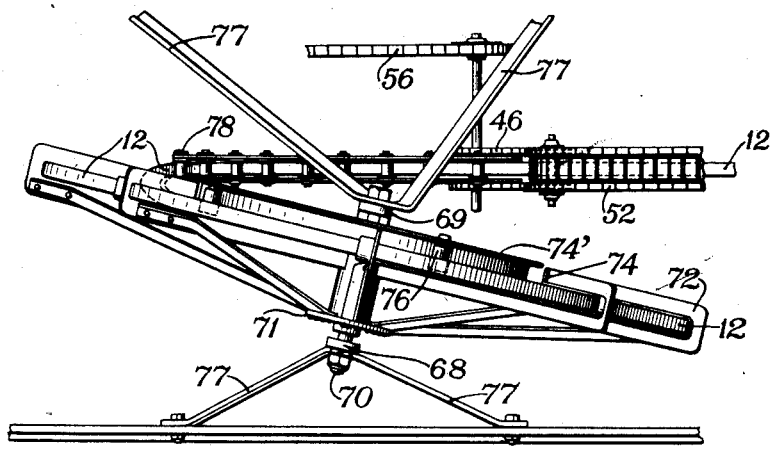
Fig. 11 is a plan view of Fig. 9 shown in a slightly tilted position.
Figure 9:
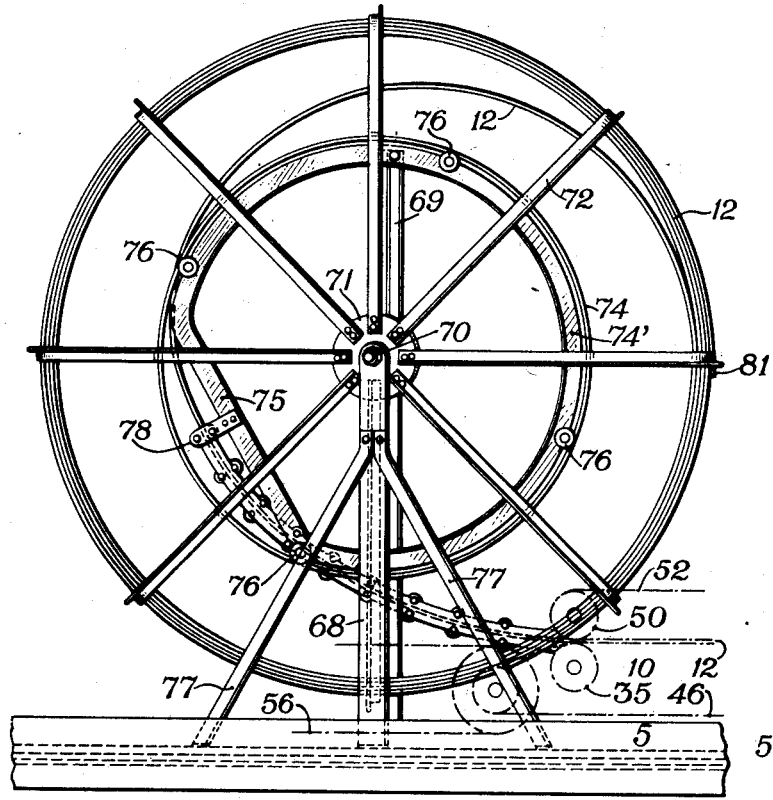
Fig. 9 is a side elevation of the reel on which the metal rod or tape is wound and unwound.
Figure 10:
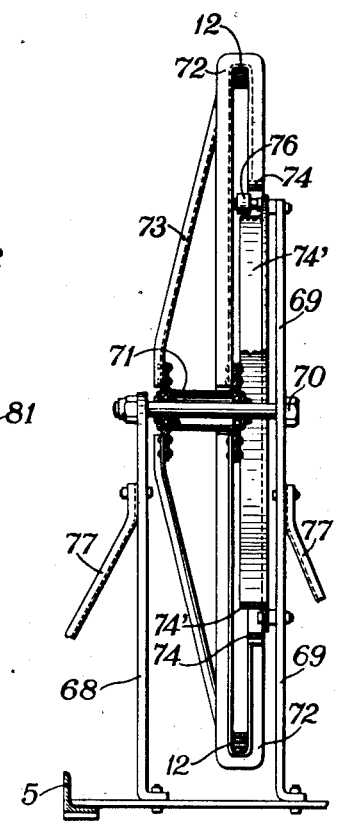
Fig. 10 is an end view, partly in section, of Fig. 9.

The reel apparatus 11, as shown in detail in Figs. 9, 10 and 11, in practice is mounted on the frame assembly 5 on the motor truck at one end of the tractor mechanism, as shown in Fig. 1. Uprights 68 and 69 support a shaft 70 which is journaled on anti-friction bearings in hub 71. The reel is of an internally winding type and of suitable outside diameter to prevent the rod or tape 12 taking a permanent set. The hub 71 is provided with a movable spider, which comprises a plurality of substantially U-shaped arms 72 extending radially from the axis or hub 71. One leg of each arm is cut off at a suitable distance from the bight of the U so as to provide an opening from one side of the reel to the interior thereof. One end of the rod or tape 12 is suitably fastened to the periphery of the reel as shown at 81, and as the convolutions of the rod or tape enter the reel they pile up from the bights of the arms towards the reel axis. To prevent the rod or tape from piling up towards the axis beyond the cut-off sides of the arms, a ring 74 is fastened to cut-off arms and a stationary ring guide 74' with rollers 76 is provided to enter the side opening in the reel and prevent the rod or tape 12 from escaping at the side opening of the reel and also prevent the rod or tape assuming too small a diameter while being unreeled. The rollers 76 of the guide ring prevents binding between the inner convolution of the reeled-up rod or tape and the guide ring. The rod or tape guide roller extends from the tractor mechanism 10 through a series of rollers 82 to the reel at one side thereof. In order that the rod or tape 12 may pass from the rollers 82 through the guide roller 78 at one side of the reel and over the external periphery of the guide ring 74' to the interior of the reel, the guide ring is flattened at one point, as shown at 75, and the guide roller 78 leads from the rollers 82 to the flattened part of the ring guide, at which point the end of the guide roller 78 is secured. This guide roller is similar in construction to that described in connection with the guide roller 63 shown in Figs. 7, 7a and 8 through which the rod or tape 12 passes from the tractor mechanism through the lead-in apparatus 15. The rod or tape while being unwound from the internal winding reel just outlined, is caused to flex more and therefore offers resisting action to overcome the mometum of the reel in one direction. When being wound upon the reel, the rod or tape unflexes and offers a resilient opposition to the momentum of the reel in the other direction.

In the operation of the improved apparatus as may be followed by reference to Fig. 1, the motor truck is placed in a suitable position with respect to the manhole 13 and the flexible lead-in 15 is introduced into the manhole with the sleeve 16 in position in the duct 14. The telescoping brace 17 is set up as shown to hold the sleeve against the back thrust of the rod or tape 12. The power take-off 6 is engaged to rotate the sprocket 18 in an anti-clockwise direction as viewed from the rear of the truck. Control lever 8 is pushed to a forward position and causes the jaw clutch 25 to engage with the jaws of gear 24. Control lever 9 is now pulled and causes the compression of the discs of clutch 27 and thus drives sprocket 28. As sprocket 28 is connected to sprocket 34 (Figs. 4, 5 and 6) of the tractor mechanism 10 by the chain 56, the latter sprocket is now driven. The sprocket 34 drives the shaft 35 and the multiple sprockets 36, and these sprockets drive the multiple roller chain 46. The chain 46 is driven in a direction away from the reel mechanism 11 and toward the manhole. The rod or tape 12 extends between the toothed puller blocks of chain 46 and the puller blocks of chain 52, and as the chain 46 is driven, these puller blocks draw the rod or tape from the reel appartus 11, shown in detail in Figs. 9, 10 and 11, and propel it through the lead-in apparatus 15 shown in Figs. 7, 7a and 8, into the conduit 14. This movement of the rod or tape 12 is continued by this means until the rod or tape reaches the next manhole, at which point a wire is coupled in any well known manner to the socket 79, Fig. 7. A meter 80 (Fig. 5) which is associated with the shaft of multiple sprocket 51 functions as a counter whereby an operator is apprised of the length of rod or tape paid out. When the desired length of rod or tape has been pushed through the conduit 14, the control lever 9 is released. The tractor mechanism 10 by which the rod or tape was propelled ceases to operate at this time to further withdraw the rod or tape from the reel. Under these conditions, as previously pointed out, the rod or tape held by the reel will flex more at this time and will offer resilient action to overcome the momentum of the reel.

When the wire at the distant manhole has been attached to the terminating socket of the rod or tape as above outlined, the control handle 8 is pulled in a backward direction and movement is imparted to the tractor mechanism 10 whereby its chains are caused to travel in a direction reverse to that just described, or in other words toward the reel mechanism to withdraw the rod or tape and its attached wire to the first manhole. When the rod or tape has been withdrawn to the first manhole the wire is disconnected therefrom and left in the duct for subsequent cable pulling operations and the rod or tape is then further rewound upon its reel. The rod, as previously pointed out, unflexes at this time when power is disconnected, and offers resilient opposition to the momentum of the reel.

What is claimed is:

A conduit duct rodding apparatus including a supply of flat resilient rodding material adapted to be fed to and from a reel, and a flexible guide member for the rodding material extending to the duct entrance, a series of spaced roller members for the guide member to facilitate the movement of the rodding material through the guide member, and a pair of band members having notches in which said roller members are retained.

JOHN B. SPOWART.